United States Patent Office 2,806,959
Patented Sept. 17, 1957

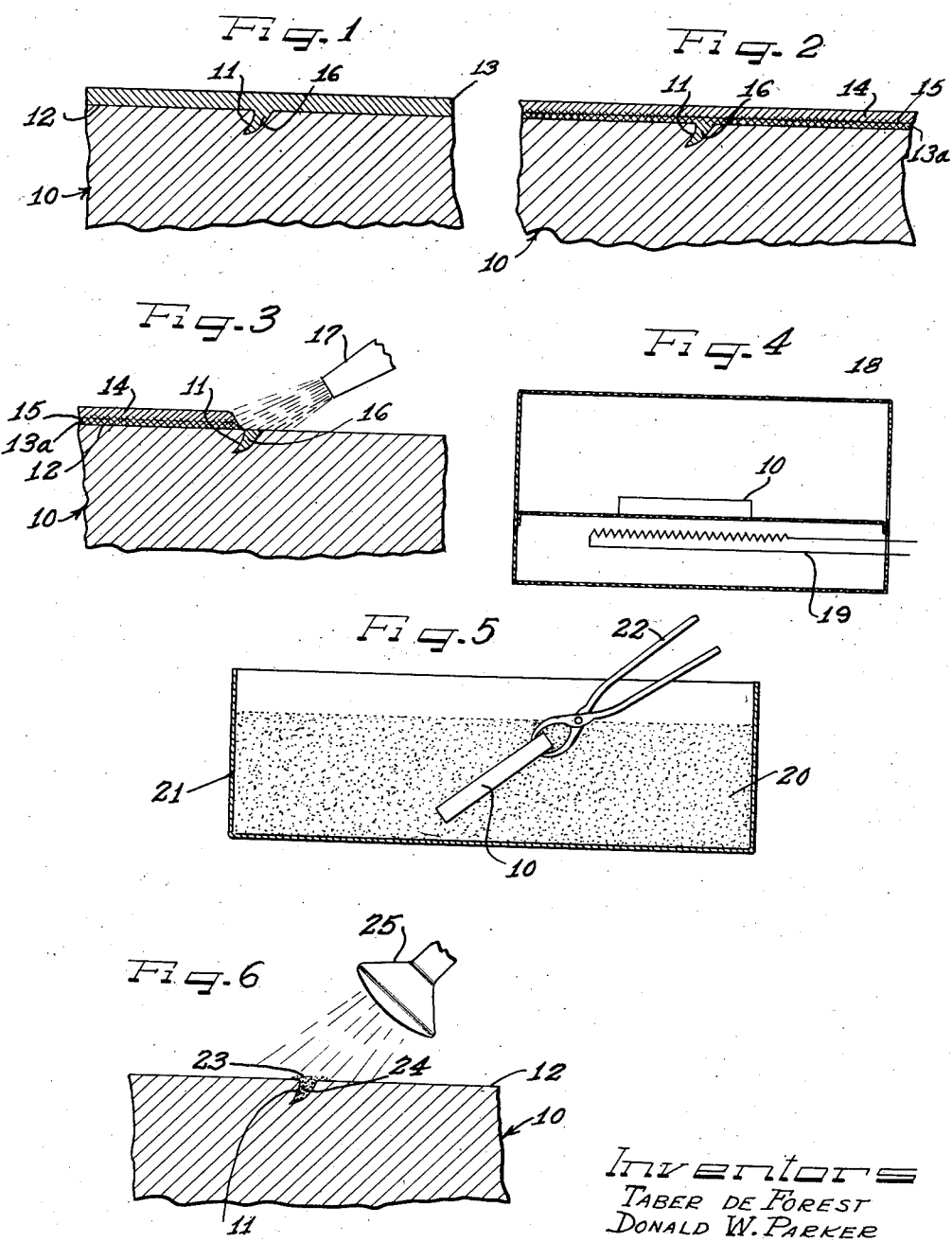

2,806,959
METHOD OF DETECTING SURFACE DISCONTINUITIES

Taber de Forest, Northbrook, and Donald W. Parker, Chicago, Ill., assignors, by mesne assignments, to Switzer Brothers, Inc., Cleveland, Ohio, a corporation of Ohio Application July 26, 1954, Serial No. 445,496

10 Claims. (Cl. 250—71)

This invention relates to a method of detecting surface discontinuities. More particularly, the invention relates to a non-destructive method of testing, wherein a liquid penetrant, preferably one containing a visible or fluorescent dye, and that is non-water-miscible and capable of penetrating surface defects, is applied to the surface of a test piece and is then rendered superficially water-emulsifiable so that it can be removed by water washing without, however, removing the unemulsified penetrant that remains behind in the surface defects and thus serves to indicate the existence and location of such defects.

It has previously been proposed, as in the Ward Patent No. 2,405,078 to use a water-emulsifiable penetrant for detecting surface discontinuities, and then wash off the penetrant by means of water. While this method has proved very satisfactory commercially, if an emulsifying agent is included in a liquid penetrant it renders the penetrant less capable of penetrating into relatively fine surface flaws, cracks and the like. Furthermore, where the emulsifying agent is incorporated into the penetrant in order to facilitate the removal of the penetrant by water washing, the water wash is liable to remove penetrant from particularly shallow or relatively wide surface defects, with the result that such defects are not rendered visible when the treated surface is inspected.

In the method of our present invention, the penetrant is preferably an oily liquid having excellent penetrating qualities but immiscible with water and substantially free from any emulsifying agent. Consequently, the penetrant cannot be washed off with water without some additional treatment. In our present method, the water washability is made possible by treating the oily penetrant, after application to the test surface, with an emulsifying liquid which, by substantially static contact with the oily penetrant, renders the latter superficially water-emulsifiable. In the subsequent washing with water, it is only the superficial, emulsified layer of the penetrant that is removed with the excess of emulsifying agent, while the unemulsified penetrant that has penetrated any surface discontinuities remains in such discontinuities and serves to indicate the existence and location thereof by the contrasting color effect that is obtained upon application to the surface of a developer, either dry or wet. Where the penetrant is contrastingly colored with a visible dye, inspection takes place under "white" light, whereas when a fluorescent dye is dissolved in the penetrant, the inspection is carried out under "black" light.

It is therefore an important object of this invention to provide a more sensitive method for the detection of surface discontinuities, as well as a method of wider applicability to the various types of surface defects that are found in industrial non-destructive testing.

It is a further important object of this invention to provide a post-emulsification method wherein a water-immiscible penetrant of excellent penetrating qualities is applied first for penetrating into any surface discontinuities that may be present, and an emulsifying liquid is subsequently applied and held in more or less static contact with the penetrant to effect an emulsification of a superficial layer of the penetrant without, however, emulsifying the portions of the penetrant that have penetrated into surface defects, whereby the emulsified superficial layer of the penetrant can be removed by water washing without disturbing the unemulsified portions of the penetrant, and whereby the presence of relatively shallow and wide cracks, as well as the presence of defects having very fine surface openings, can be detected because the non-water-miscible penetrant is not washed out of such wide, shallow cracks and is better able to enter into the finer surface defects.

Other and further important objects of this invention become apparent from the following description and appended claims.

As shown on the drawings:

The drawings illustrate a preferred embodiment of our invention, wherein:

Figure 1 is a greatly enlarged, cross sectional, fragmentary view of a test piece to the surface of which has been applied an excess of liquid penetrant.

Figure 2 is a similar cross sectional view showing the condition of the surface after the excess of penetrant has been removed and a liquid emulsifing agent has been applied.

Figure 3 is a similar view illustrating diagrammatically the washing off of the liquid emulsifying agent and the emulsified portions of the penetrant by means of a water wash.

Figure 4 is a diagrammatic view of a drying oven in which the test piece is dried after the water washing operation.

Figure 5 is a diagrammatic sectional view illustrating the application to the test piece of a dry developer powder.

Figure 6 is a diagrammatic view illustrating the inspection of the test piece under a source of exciting radiation.

On the drawings:

The reference numeral 10 indicates a test piece, which may be formed of any solid material that has a relatively liquid impermeable surface, such as metal, both ferrous and non-ferrous, glazed ceramics and the like. For purposes of illustration, the test piece 10 is shown to have a surface discontinuity, or defect, indicated at 11. The size of the defect 11 is greatly exaggerated in order more clearly to show the techniques that are involved.

In the first step, after the test piece 10 has been suitably cleaned, or cleaned and dried, the surface 12 thereof, which is to be inspected, is subjected to a liquid penetrant in such manner that the penetrant can completely wet the surface and form a substantially continuous layer 13 thereover. The part 10 can be dipped into a bath of the liquid penetrant and then immediately removed and allowed to drain, or the penetrant can be poured or sprayed over the surface 12 of the part 10. Since the penetrant has the ability to wet the surface 12 and is relatively non-viscous in character, it will penetrate into the defect 11 and fill the same, as shown in Figures 1–3.

After the excess of the penetrant in the layer 13 has been allowed to drain off, as for instance to a thickness represented by the film 13a (Fig. 2), a liquid emulsifier is applied in such a manner as to wet and spread over all of the surfaces to which the penetrant has been applied. The emulsifier may be applied in the same manner as the penetrant, but preferably there is no substantial movement or force used that would tend to disrupt the layer 13a of the penetrant when applying the liquid emulsifier thereover. The liquid emulsifier forms an overlying layer 14 which is in contact with the layer 13a along the interface 15. A suitable drain time is allowed for the draining off of any excess of the liquid emulsifying agent. During this period, which may be on the order of a few minutes, there is substantially static contact between the layer 14 of the liquid emulsifying agent and the underlying layer 13a of the penetrant. The length of time during which the static contact is allowed to continue should be sufficient to effect an emulsification of the liquid penetrant layer 13a at the interface 15, but for a limited depth insufficient to effect emulsification of that portion of the penetrant, indicated at 16 that lies within a surface opening 11. When inspecting for shallow or open defects, the emulsification period should be the minimum length of time, as shown by tests, required for the removal of the penetrant layer 13a from the surface 12 upon subsequent washing off, without removing the penetrant from shallow or open defects. Since the emulsification of the liquid penetrant layer 13a takes place as the result of the phenomenon of diffusion between the layer 14 of liquid emulsifier and said layer 13a, the extent of the diffusion and the consequent emulsification of the liquid penetrant can be controlled comparatively accurately as a result of previous experience and testing by the operator.

At the completion of the emulsification period, the part 10 is washed with water, as by means of the hose 17 to remove the layers 14 and 13a, without, however, removing the unemulsified penetrant 16 in the surface defect 11. If the part does not wash cleanly and has a detrimental background following water washing, the length of the emulsification period and/or of the penetrant drain period should be increased. The emulsification step should never be repeated in order to obtain a good wash, but the part should be returned to the start of the operation and all of the steps repeated.

We have found that the severity of the water wash, or the time under the spray nozzle, has very little effect upon the sensitivity of the test. Very little possibility exists of overwashing, since the portion of penetrant 16 in the defect 11 contains no emulsifier and therefore does not wash away with the water. A vigorous washing operation is preferred in order to insure the removal of the emulsifier and penetrant layers 14 and 13a as completely as possible. As indicated in Figures 2 and 3 by the common cross-hatching, the layers 14 and 13a are both water washable because of the water solubility of the emulsifier in layer 14 and the diffusion of the emulsifier into layer 13a. Warm water facilitates the washing and subsequent drying operations.

As illustrated in Figure 4, after being water washed, the test piece 10 is put in an oven, indicated generally by the reference numeral 18 and having a suitable source of heating, such as electrical heating elements 19. The time and temperature of drying are both kept to a practical minimum. Actually, drying can be carried out at room temperature, but this is not generally practical. The use of an air blast, or draft of warm air aids in the drying operation.

After the test piece 10 has been dried, it is removed from the oven 18 and dipped into a developer powder, indicated by the reference numeral 20, contained within a vessel 21. The dipping can be carried out manually by the use of a pair of pliers 22 or other gripping tool. The developer powder 20 is so very light that it acts as a liquid and will permit parts dropped into it to sink rapidly. The part 10 is moved around in the bed of powder 20 to insure complete coverage of all surfaces that are to be tested, with the powder.

The purpose of using the developer 20 is to render more visible the portion of penetrant remaining within the crack or defect 11. If the liquid penetrant is colored by means of a dye dissolved therein, as is preferable, the color of the penetrant shows up by contrast if a light colored powder is used as the developer. The powder is sufficiently finely divided to act as a wick and cause the liquid penetrant to be drawn up out of the surface defect 11 by the action of capillarity. Thus, the colored penetrant wets and stains the particles of developer powder 20 that come in contact with the penetrant at said defect 11.

This result is illustrated in Figure 6, which shows a small accumulation 23 of penetrant-wet developer powder 24 in and about the surface defect 11. The non-adherent powder is removed, as by means of an air stream, from the surface 12, generally. If a visible dye has been used in the penetrant, the test piece is then inspected under "white" light, but if a fluorescent dye has been used, so-called "black" light is used, or ultra violet light. A light source 25 is shown (Fig. 6) for irradiating the surface on which the accumulation 23 appears to thereby render the contrasting color of the penetrant-wet developer powder more readily visible.

Instead of a dry powder developer, a wet developer can be used. In this case, the powder is usually mixed with a relatively volatile solvent, such as water or alcohol, to form a suspension, and the suspension is then applied to the surface undergoing testing and allowed to dry. The test piece is finally inspected under an appropriate source of radiation.

Various compositions of penetrant may be employed, and the following will serve to illustrate those that have been found suitable:

*Formula #1*

Vehicle:
    Refined kerosene _____ percent by volume __ 40
    Bright stock (SAE #60 Lube Oil) _____ do ____ 45
    Dye solvent _____ do ____ 15

Dye:
    Fluorol 7GA _____ grams per 100 ml __ 0.35

In the above Formula #1, the dye solvent can be an alkyl-aryl phosphate, available as a plasticizer under the proprietary name Santicizer 141. Other dye solvents that are miscible with petroleum oils can be used. In general, aralkyl esters have been found to be excellent solvents for the dye. Such dye solvents are used in minor proportions of the total vehicle to compensate for the poor solvent action toward the dye used of the remaining major oily portion of the vehicle.

Fluorol 7GA is a fluorescent dye put out under that proprietary name by General Dyestuffs Corporation. Other oil-soluble fluorescent dyes may be used.

*Formula #2*

Vehicle:
    Naphtha _____ percent by volume __ 75
    Partially hydrogenated terphenyl _____ do ____ 25

Dye:
    2,7-dimethyl coeroxen _____ grams per 100 ml __ 0.8

*Formula #3*

Vehicle:
    Kerosene (high flash) _____ percent by volume __ 40
    Bright Stock #1175 _____ do ____ 30
    Partially hydrogenated terphenyl _____ do ____ 20
    Alkyl aryl phosphate _____ do ____ 10

Dye:
    Fluorol 7GA _____ grams per 100 ml __ 0.35

Formulae Nos. 1, 2 and 3, are compositions of fluorescent penetrants. Other examples of fluorescent dyes that are soluble in the penetrant vehicles are perylene and celliton brilliant yellow FFA (4-amino-1,8-naphthyl-2',4' dimethylphenylimide).

As an example of a visible penetrant, the following is given:

*Formula #4*

Vehicle:
    VM & P Naphtha _____ percent by volume __ 75
    Partially hydrogenated terphenyl _____ do ____ 25

Dye:
    #322 Mefford oil red dye __ grams per 100 ml __ 3

Other oil soluble visible dyes can be used, such as duPont oil Blue A. In general, however, fluorescent dyes are preferred, since they can be rendered more strongly visible by inspection under black light.

With respect to the penetrant used in our method, it has the property of clinging, or adhering, to the surface of a test part even through it may be quite dry, as is the case before the penetrant starts to bleed from the cracks. Silica, on the other hand, will cling only when moist, so requires that the penetrant be bleeding out of the surface defect if the silica is to adhere to that locality. Due to its characteristics, talc will act as a complete developing agent on fine cracks, and will act as a wick to carry the liquid penetrant to the silica. The silica then picks up the penetrant from the talc "wick" and builds up a much heavier indication. In the case of large cracks, the silica can act by itself as a primary indicator. Also, due to its transparent nature, the silica gives brighter indications since ultra violet light can penetrate through the silica and the visible light from the penetrant can similarly be transmitted through the silica particles.

The preferred type of silica is a high purity, extremely low density, silica ($SiO_2$) exhibiting a very high oil absorptivity. It is a white, uniform, impalpable, free-flowing powder having a density of about 7.5 pounds per cubic foot (centrifuged in toluol), a pH of 7.2, a purity of 99.5%, an oil absorption of 240 pounds of oil per 100 pounds of silica, and a surface area (nitrogen) of 290 $M^2$/gram. In general, it has a particle size less than about 10 microns, with a 2 to 3 micron average diameter.

A suitable formula for a dry developer is the following:

Formula #12

| Vehicle: | Percent by weight |
|---|---|
| Silica | 80 |
| Talc | 20 |

Wet developers may also be used, as previously stated. One suitable composition of wet developer is the following:

Formula #13

| Vehicle: | Percent by weight |
|---|---|
| Calcium carbonate | 75 |
| 325 mesh bentonite | 14 |
| Sodium nitrite | 6.25 |
| Alkyl aryl sulfonate | 4.75 |
| | 100.00 |
| Chromate type rust inhibitor (percent of total) | 0.08 |

In the foregoing formula the calcium carbonate acts as the developing agent and the bentonite serves as a suspending agent. The purpose of the sodium nitrite is to give a water soluble crystal lattice effect in the dry film since this increases the ease with which the material can eventually be washed off the part. The alkyl aryl sulfonate, which is available under the proprietary name Alkanol DD, serves as a wetting agent, while the rust inhibitor, available under the proprietary name Dearborn 514, serves to inhibit rust formation, and also appears to serve to a degree in quenching background fluorescence where a fluorescent dye is present in the liquid penetrant.

In the case of wet developers, various substitutions may be made, as for instance, talc can be used in place of calcium carbonate and activated clay can be used as a substitute for Bentonite. Potassium sulphate will accomplish about the same result as sodium nitrate. Almost any household detergent that does not fluoresce under black light can be used in place of Alkanol DD. In all the wet developer formulae herein given, water is the carrier unless alcohol is specified. A wet developer is preferably used with a penetrant that contains a visible dye, and the wet developer, after being applied to the test surface, is allowed to dry to form a continuous white coating thereover.

A formula for a wet developer using alcohol as the liquid vehicle is the following:

Formula #14

| Vehicle: | Percent by weight |
|---|---|
| Calcium carbonate | 300 |
| Isopropyl alcohol | 150 |

This mixture is ground as a concentrate and subsequently diluted 3 parts by weight of concentrate to 4 parts by weight of ethyl alcohol. In use, the material is painted or sprayed onto a test part to form a thin liquid film, which subsequently dries to a uniform powder film as the alcohol evaporates. Before evaporating, the alcohol seems to aid in bringing the colored penetrant out of the surface defects into the developing powder.

Formulae #13 and #14 can be used with fluorescent penetrants but are most widely used with visible penetrants where an overall white uniform contrasting background is required for the visible indications.

All viscosity measurements given herein are readings at room temperature (20° C.).

While the water washing step may be carried out quite vigorously without displacing the unemulsified penetrant, it should not be supplemented or replaced by anything as drastic as a vapor phase degreasing step, since the latter would remove all of the penetrant from the surface defects. Neither should the drying step be carried out at such a temperature as to volatilize the oily penetrant. In general, oven temperatures of around 100° C. are satisfactory for the drying step.

Also, other dyes than those specified may be used, such as a blue oil-soluble dye, for instance Alizarine Irisol N-powder (marketed by General Dyestuffs Corporation); oil-soluble red dyes, such as Calco #N-1700; and duPont oil Blue A.

We claim as our invention:

1. The method of detecting surface discontinuities in test pieces, which comprises applying to the surface of a test piece a coating of a liquid penetrant that is non-water miscible and capable of penetrating surface discontinuities that may be present, applying over the resulting coating of liquid penetrant an emulsifier layer containing an emulsifier miscible with said liquid penetrant to render any resulting mixture water emulsifiable, establishing substantially static contact between said emulsifier layer and said penetrant coating until diffusion into the superficial portion of said penetrant coating has occurred without diffusion into those portions of said penetrant coating that may have penetrated into surface discontinuities, promptly applying water to the test piece until all of the emulsifier layer and the emulsifiable superficial portion of said penetrant have been removed from said surface, leaving only penetrant containing no emulsifier that may have penetrated into surface discontinuities, drying said surface, applying to said dried surface a developer capable of withdrawing unemulsified penetrant from any surface discontinuities and subjecting said surface to radiation capable of rendering more visible any spot at which penetrant has been so withdrawn from a surface discontinuity.

2. The method of claim 1 in which the penetrant is a colored oily penetrant and any excess of penetrant over that required to form a thin continuous film of penetrant over the surface of the test piece is removed before applying the emulsifier layer thereover.

3. The method of claim 1 in which the penetrant contains a coloring matter dissolved therein, the emulsifier layer consists of a relatively viscous liquid and the developer is a finely divided light colored powder capable of absorbing the penetrant.

4. The method of claim 3 in which the coloring matter is a fluorescent dye and the radiation is an exciting radiation causing said dye to fluoresce.

5. The method of claim 3 in which the coloring matter is a dye and the penetrant has a minor proportion of a good solvent for the dye and a major proportion of an must be a liquid that has the property of wetting the surface to be tested and that has the ability to penetrate fine surface cracks and other flaws having surface openings. In general, an oily penetrant is best suited for our purposes. Since water miscibility is not desired, it is preferable not to include any emulsifying agent in the penetrant, as such, but to choose a penetrant primarily for its high penetrating ability and its good "wetting" properties. When used in an open tank, the penetrant should also have a relatively low vapor pressure and a high flash point and should be relatively incombustible in order to reduce fire hazards to a minimum, and it should be relatively non-toxic. Satisfactory penetrant vehicles of the oily type include kerosene, mineral spirits, light fuel oils, and certain proprietary products, such as Sovaloid C, which is an alkylated aromatic petroleum compound having a minimum aromatic content of 98%, of which 60% represents polyalkylated naphthalenes, such as tri-tetramethylated naphthalenes; and, in addition, a partially hydrogenated terphenyl product, which is probably largely 1,4-diphenyl benzene.

Other types of penetrants that can be used, but that are not preferred, are the benzenoid hydrocarbons, such as benzene, toluene and xylene; ketones such as isophorone and acetophenone; esters such as butyl acetate and amyl acetate; and acids such as caprylic acid. Since some of these penetrants are appreciably soluble in water, care must be taken in water washing to remove the excess of the colored penetrant not to use such a vigorous water wash as to remove accumulations of the colored penetrant from any surface discontinuities of the type that are to be detected.

Examples of suitable liquid emulsifier compositions are the following:

*Formula #5*

Vehicle: Percent by volume
2 Fuel oil _____ 57
Tall oil (medium viscosity) _____ 30
Saturated aqueous solution of borax _____ 1
Triethanol amine _____ 12

A suitable tall oil is one that is known under the proprietary name Latol RGN. In order to mask the odor of this composition, a small quantity of a commercial perfume, such as Alamask AO, may be used and a small amount of Rhodamine B may be dissolved in the composition to give it a distinctive red color. The liquid emulsifier of the above Formula #5, while relatively more viscous than the formulae given for the liquid penetrants, is much less viscous than some liquid emulsifiers that have been found satisfactory. Where the liquid emulsifier is less viscous, it is cheaper to use, since less material is lost by being dragged out on the parts under test. The less viscous liquid emulsifier shows the same order of sensitivity to very fine cracks as the thicker material, but there is some loss of sensitivity on wide, or shallow defects due to the fact that the thinner emulsifier goes into them more easily and thus causes the penetrant to be washed out in the subsequent water washing operation.

Another emulsifier composition, which is highly viscous and yet entirely satisfactory is the following:

*Formula #6*

Vehicle: Percent by volume
Kerosene _____ 23
Refined tall oil _____ 55
Triethanol amine _____ 22

The liquid emulsifier of this formula has the advantage that it is extremely low in free sulphur. This is of considerable importance in the testing of high nickel alloys that are subject to high temperatures in use or during fabrication subsequent to the application of the test materials, since sulphur left on a high nickel alloy part will frequently result in ultimate cracking or failure of the part.

*Formula #7*

Vehicle:
Twitchell oil #7231 _____percent by volume__ 100

Twitchell oil #7231 is a mixture of straight petroleum oils with sulfonated oils and is available from Emery Industries. This is a heavy, high viscosity emulsifier having a viscosity as high as 1250 centistokes. A thick emulsifier such as this does not mix so readily with the penetrant that has penetrated into any surface defect, or opening, and thus is more effective in the case of the wide, shallow type of surface defect in making such defect visible upon inspection.

*Formula #8*

Vehicle: Percent by volume
Kerosene _____ 44
Oleic acid _____ 35
Triethanol amine _____ 21

In the foregoing formula, it is, of course, possible to react the oleic acid with the triethanol amine to form triethanol amine oleate, prior to mixing with the kerosene. It is simpler, however, to mix all the ingredients of the formula together and let the reaction to form a soap take place in solution. This is also true of the compositions specified in Formulae #5 and #6. The main purpose of the kerosene in this mixture is to render the emulsifier fluid, and the amount of kerosene used may be varied from 20% to 80% by volume of the total mixture, depending upon the viscosity desired.

*Formula #9*

Percent by volume
Vehicle: Polyoxyethylene sorbitol oleate laurate____ 100

This is a non-ionic surface active agent that can be used as is. A commercially available material is that known as G-1144, put out by Atlas Powder Company.

*Formula #10*

Percent by volume
Vehicle: An alkyl aryl polyether alcohol_____ 100

A suitable alkyl aryl polyether alcohol is available under the proprietary name Triton X100, which may be used as such.

*Formula #11*

Percent by volume
Vehicle: An alkyl aryl sulfonate_____ 100

A suitable product of this character, known by the proprietary name Atlas G-3300, may be used without the addition of other materials.

As previously stated, the viscosity of the liquid emulsifiers can be varied considerably. Where maximum sensitivity is desired only in the case of extremely fine cracks and the cost of the operation is a major factor, emulsifiers having a viscosity as low as 20 centistokes can be used. At the other end of the range, highly viscous materials such as Formula #7, with viscosities up to as high as 1250 centistokes, or so, at room temperature have been found effective. The viscosity of the emulsifier should be sufficiently high that its flow from the part being tested will not be so rapid as to carry penetrant away with it by a purely mechanical or physical action.

With regard to the viscosity of the liquid penetrant, that is not at all critical. About the only requirements from the standpoint of viscosity are that the penetrant be viscous enough to stay on the surface to which it is applied, but be sufficiently fluid to flow over such surface and drain easily therefrom. If the liquid penetrant has a viscosity below 4 or 5 centistokes, it will run off too freely, but materials with viscosities as high as 1000 centistokes have been found quite satisfactory in most cases.

A suitable type of dry developer is a low density, finely powdered silica, preferably admixed with talc. The talc oily diluent having poor solvent powers toward said dye.

6. The method of claim 1, wherein the liquid emulsifier is a mixture of petroleum oil and sulfonated oils.

7. The method of claim 1, wherein the emulsifying liquid is a mixture containing a petroleum oil and a dissolved soap.

8. The method of claim 1, wherein the emulsifying liquid is a mixture of fuel oil, tall oil, and triethanolamine.

9. The method as defined in claim 1, wherein the penetrant is colored with a visible dye dissolved therein and the subsequent visual observation is carried out in white light.

10. The method as defined in claim 1, wherein the color in the penetrant is a visible color and the developer power is applied to the test surface in the form of a liquid suspension of a white powder and is dried on said surface as a white coating thereover.

References Cited in the file of this patent

UNITED STATES PATENTS

| | | |
|---|---|---|
| 2,259,400 | Switzer | Oct. 14, 1941 |
| 2,478,951 | Stokely et al. | Aug. 16, 1949 |